United States Patent Office 3,505,402
Patented Apr. 7, 1970

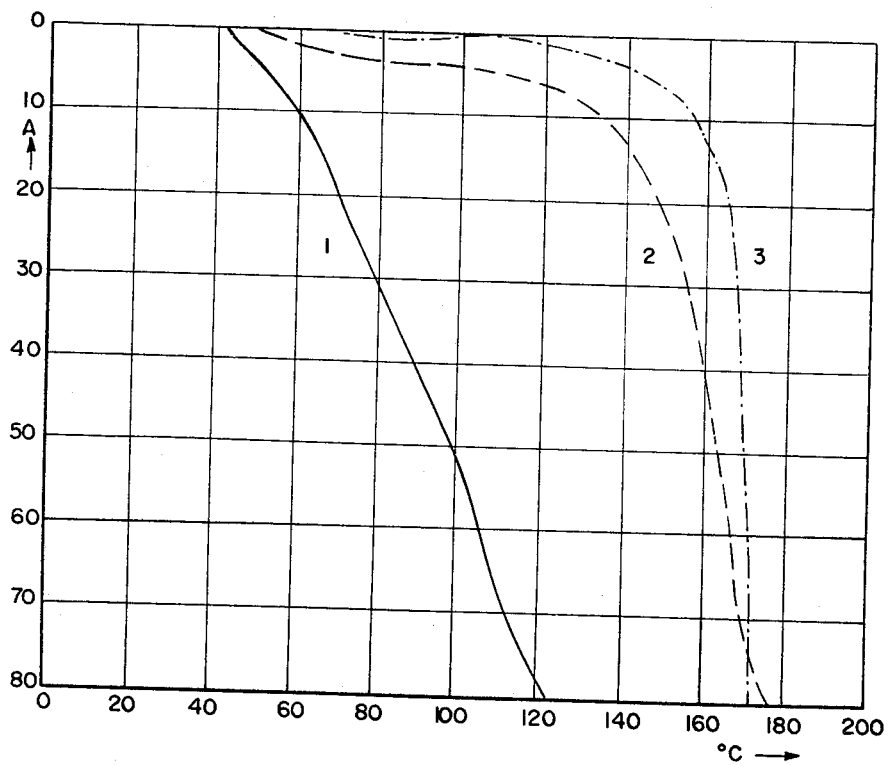

3,505,402
TETRAHYDROTRICYCLOPENTADIENYLENE DIAMINES
Paul Raff and Ludwig Schuster, Ludwigshafen (Rhine), Guenter Becht, Speyer (Rhine), and Helmut Doerfel, Ludwigshafen (Rhine), Germany, assignors to Badische Anilin- & Soda-Fabrik Aktiengesellschaft, Ludwigshafen (Rhine), Germany
Filed Oct. 26, 1965, Ser. No. 505,291
Claims priority, application Germany, Oct. 29, 1964, B 79,115; Mar. 27, 1965, 1,570,246
Int. Cl. C07c 85/00, 87/64
U.S. Cl. 260—563
1 Claim

ABSTRACT OF THE DISCLOSURE

Tetrahydrotricyclopentadienylene diamines suitable for the production of completely transparent polyamides and having the formula

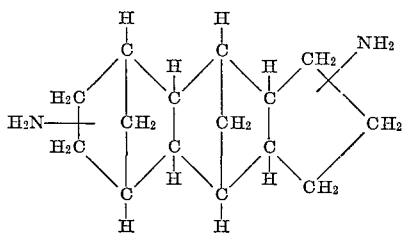

and a process for the manufacture of the said diamine wherein tricyclopentadiene is reacted with an excess of hydrogen cyanide in the presence of 3 to 6 moles of concentrated sulfuric acid at a temperature of from −5 to +35° C. and the tetrahydrotricyclopentadienylene diformyl diamines thus obtained are hydrolyzed.

---

This invention relates to a process for the production of tetrahydrotricyclopentadienylene diamines having the formula:

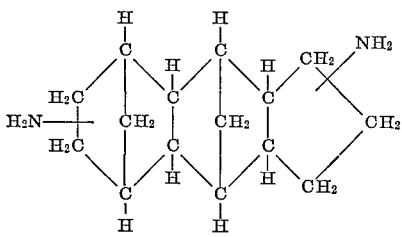

It is known that olefins may be reacted with hydrocyanic acid and sulfuric acid by the Ritter reaction to form N-formylamines. These may easily be hydrolyzed to the corresponding amines either in acid or in alkaline medium.

Diolefins have also been reacted according to the said reaction. Thus according to U.S. patent specification No. 2,632,023 2,5-diamino-2,5-dimethylhexane is obtained from 2,5-dimethylhexadiene-(1,5) by reaction with 1.5 to 5 moles of a 16% to 90% sulfuric acid and with 2 to 3 moles of hydrogen cyanide per mole of 2,5-dimethylhexadiene-(1,5) at temperatures of from 15° to 50° C. followed by working up. Limonene may be reacted to form 1,8-diamino-p-menthane under analogous conditions according to German patent specification No. 872,789. U.S. patent specification No. 3,068,286 furthermore states that 4-vinylcyclohexene-(1) can be reacted in the presence of an emulsifier with a 2 molar excess of hydrogen cyanide, at least a molar amount of water and an at least 1 molar excess of sulfuric acid at 25° to 30° C. to form aminoethylcyclohexanol and a little diamine.

The yields of diamines in the said methods are from 19% to 69% of the theory.

If tricyclopentadiene be reacted under analogous conditions to those described in the literature for diolefins, only relatively low yields of diamine are obtained using conventional methods.

In all the methods for converting a diene to a diamine by the Ritter reaction, a molar ratio of diolefin to hydrocyanic acid of from 1:2 to a maximum of 1:3 is used. Although yields are relatively low, so that an improvement would certainly be desirable, it is claimed in German patent specification No. 872,789 and in U.S. patent specification No. 2,632,023 that no advantage can be seen in using a higher ratio than 3 moles of hydrogen cyanide to 1 mole of starting material and that the ratio is preferably from 2 to 2.5 moles of hydrogen cyanide to 1 mole of diene.

It is an object of this invention to provide a method for the production of tetrahydrotricyclopentadienylene diamines which have not previously been described. It is another object of the invention to provide process conditions under which the conversion of tricyclopentadiene to diamine by the Ritter reaction takes place with higher yields than are achieved with other dienes and diamines. These and other objects and advantages will be better understood from the following detailed description.

We have found that tetrahydrotricyclopentadienylene diamines having the formula:

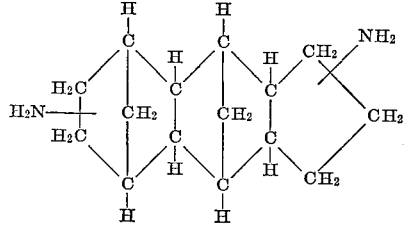

(hereinafter referred to as tetrahydrotricyclopentadienylene diamine mixture) are surprisingly obtained in much higher yields by reaction of tricyclopentadiene with hydrogen cyanide in the presence of sulfuric acid at a temperature of from −5° to +35° C., preferably from 0° to 30° C., and hydrolysis of the tetrahydrotricyclopentadienylene diformyl diamine mixture thus obtained, by using the hydrogen cyanide in at least four times, preferably six to sixteen times, the molar amount with reference to tricyclopentadiene and the sulfuric acid in three to six times, preferably four times, the molar amount with reference to tricyclopentadiene.

The reaction may be represented by the following formulae:

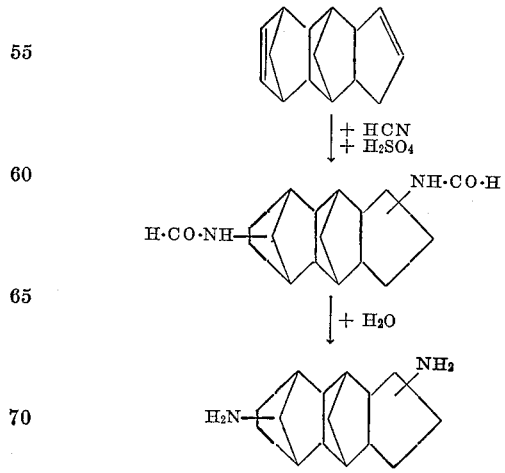

The positions of the formylamino and amino groups are assumed to be statistically distributed over the four possibilities. The increase in yield according to this invention is the more surprising because hydrogen cyanide exhibits no solvent power whatever for the hydrocarbon to be reacted. When a very large excess of hydrogen cyanide is used, in fact separation of the mixture into its components takes place after the reaction is over. The mixture, originally homogeneous, separates into two layers, a lighter layer composed of hydrogen cyanide and a heavier layer composed of reaction product, sulfuric acid and hydrogen cyanide. It is advantageous to use such an excess of hydrogen cyanide that the said separation is only just avoided. With a ratio of 1 mole of diolefin to 4 moles of sulfuric acid, the said limit is at about 12 moles of hydrogen cyanide. When a higher ratio of sulfuric acid to diolefin is used, the proportion of hydrogen cyanide may also be raised without the reaction mixture becoming inhomogeneous. The sulfuric acid is preferably used as 80% to 96% sulfuric acid.

The reaction may be carried out for example in one stage or in two stages. When working in one stage, for example hydrogen cyanide and sulfuric acid may be placed in a reactor and tricyclopentadiene slowly added to the mixture with immediate intense mixing, for example by a turbine mixer. The diene is advantageously added at 0° to 5° C. and the usual after reaction is carried out at room temperature up to slightly elevated temperature, for example 25° to 30° C. When working in two stages, about half of the unreacted hydrogen cyanide is removed for example by distillation (advantageously using a stream of carrier gas from which the hydrogen cyanide may be recovered by condensation) after the diolefin has been added but prior to the after reaction.

Tricyclopentadiene has a melting point range of from 60° to 68° C. and it may therefore be sprayed in molten condition through a fine nozzle under pressure into the intensely stirred reaction mixture or it may be introduced in portions as a crystalline powder.

The process may be carried out batchwise in a stirred vessel or continuously in a suitable apparatus, for example using an endless tubular mixing vessel. In such an endless tubular vessel a fine distribution of the diene (which is insoluble in the reaction mixture) is achieved by strong turbulence in the circulation tube. The fine distribution is considerably promoted by forcing the tricyclopentadiene into the endless tubular reactor through a fine nozzle.

The process is generally carried out at atmospheric pressure. In some circumstances, for example when an endless tubular reactor is being used, it is better to employ superatmospheric pressure of for example up to 5 atmospheres gauge.

The reaction mixture is worked up in a conventional manner. For example water may be added in an amount of 0.4 to 2 parts per part of reaction mixture and the excess hydrocyanic acid distilled off. The residue is then heated under reflux to hydrolyze the diformamides formed. The diamine mixture is separated from the hydrolyzed mixture in the usual way by adding alkalies or alkaline earth metal hydroxides, particularly sodium hydroxide, potassium hydroxide, calcium hydroxide or calcium oxide, if desired in the form of concentrated aqueous solutions, until a strongly alkaline reaction has been set up, for example a pH value of 12, preferably with heating, for example to 90° to 100° C. or if desired under superatmospheric pressure to even higher temperatures, for example 150° C., and if desired extracting the mother liquor with a water-immiscible solvent whose boiling point is advantageously above 30° C., preferably above 80° C. Primary, secondary and tertiary amines, particularly those having six to fourteen carbon atoms in the molecule, triethylamine, cyclohexylamine, cyclooctylamine, tertiary-isooctylamine, tertiaryisononylamine and tertiary-isododecylamine, have proved to be suitable. It is advantageous to maintain such relative proportions during the addition of the inorganic bases that an aqueous phase is obtained which is as saturated as possible with salts but from which no salt crystallizes out, because then the diamine may be extracted with a small amount of solvent.

The tetrahydrotricyclopentadieneylene diamine mixture obtainable according to this invention is a valuable intermediate for the production of polyamides, polyisocyanates and plant protection agents. It may also be used as a hardner for epoxy resins.

By polycondensation of the mixtures of tetrahydrotricyclopentadienylene diamines having the molecular formula $C_{15}H_{24}N_2$, obtained by the process according to this invention, with dicarboxylic acids or their esters or chlorides at elevated temperature, if desired at superatmospheric pressure, there are obtained completely transparent polyamides having a high softening point.

It is known that transparent polyamides may be produced by polycondensing salts of the diamine/dicarboxylic acid type at elevated temperature and if desired at superatmospheric pressure. In this method, for example aliphatic diamines having branched carbon chains, such as trimethylhexamethylene diamine, cyclohexene derivatives, such as 3-aminomethyl-(3,5,5-trimethyl-1-cyclohexylamine), or diamines which are derived from fluorene, such as 9,9-bis-(3'-aminopropyl)-fluorene, are used as the diamines. Some of these polyamides are difficulty accessible, some have a relatively low softening point and some are readily attacked by organic solvents. It is also known that transparent polyamides may be produced by polycondensing mixtures of several polyamide-forming starting materials, e.g. a mixture of caprolactam, 4,4'-diaminodicyclohexylmethane/adipic acid and hexamethylenediamine/adipic acid, or by mixing homocondensates with transparent copolyamides. Such polyamides usually have a lower softening point than homopolyamides; moreover, they are not resistant to organic solvents, have considerably cold flow and form spherulities on heating with the result that they become turbid.

On contrast to this the new polyamides according to this invention have the advantage that they contain a readily accessible diamine and have a high softening point. Even thick-walled articles made of the novel polyamides are completely transparent. Homopolyamides in particular have high softening points and do not lose their transparency when tempered for a long period at temperatures close to their softening points. When boiled in water the polyamides lose none of their transparency. The polyamides manufactured according to this invention have unusually high glass temperatures so that at elevated temperature they are stiffer than partly crystalline polyamides whose glass temperatures are usually below 50° C.

Aliphatic dicarboxylic acids, particularly alkanedicarboxylic acids having 5 to 8 carbon atoms, such as adipic acid, suberic acid, sebacic acid, decanedicarboxylic acid, heptadecanedicarboxylic acid or mixtures of these acids are preferred as dicarboxylic acids. Araliphatic dicarboxylic acids, such as p-phenylene-bis(3,3'-isovaleric acid), and cycloaliphatic dicarboxylic acids, such as cyclohexanedicarboxylic acid and cyclooctanedicarboxylic acid, are also suitable; aromatic dicarboxylic acids are advantageously used in admixture with other acids, particularly with aliphatic dicarboxylic acids, for the manufacture of polyamides containing tetrahydrotricyclopentadienylene diamines.

The mixture of tetrahydrotricyclopentadienylene diamines may also be used as a polyamide-forming component in the manufacture of copolyamides; in this case, there may be employed as starting materials for example a mixture of tetrahydrotricyclopentadienylene diamine with other diamines commonly used in polyamide production instead of tetrahydrotricyclopentadienylene diamine, alone, or a mixture of dicarboxylic acids, or a mixture of dicarboxylic acids with lactams having preferably 7 to 12 ring members or with aminocarboxylic acids.

Conventional polycondensation methods are suitable for the production of the new polyamides. The polyamides may be obtained for example by heating about equimolar amounts of the salts of the tetrahydrotricyclopentadienylene diamine mixture and the dicarboxylic acids at superatomspheric pressure in the absence of oxygen, water being removed at least in the last phase of the polycondensation. To accelerate water removal inert gases, such as nitrogen, may be passed through or over the polycondensation mixture or the polycondensation may be carried out at subatmospheric pressure. The new polyamides may also be produced by interfacial polycondensation or by solution polycondensation. In the case of interfacial polycondensation the tetrahydrotricyclochlorides in conventional manner in a two-phase mixture of water and for example aromatic hydrocarbons, such as toluene.

Polycondensation may be carried out in the presence of conventional additives, such as chain terminators, e.g. carboxylic acids or their derivatives or amines, heat or light stabilizers, melt-viscosity stabilizers, optical brighteners, fillers or lubricants.

The new completely transparent polyamides may be readily shaped and are suitable for example for the manufacture of molded articles, such as sheets, tubes, rods, bristles, filaments or injection-molded articles.

The invention is further illustrated by the following examples. The parts and percentages specified in the examples are by weight.

EXAMPLE 1

A mixture of 1067 parts of 90% sulfuric acid and 780 parts of anhydrous hydrocyanic acid is placed in a vessel having a high-speed stirrer. With intense stirring, 495 parts of molten tricyclopentadiene is sprayed through nozzles having a bore of 0.5 mm. diameter into the mixture of hydrocyanic acid and sulfuric acid, the temperature being kept at 0° to 3° C. by external cooling. A clear brown solution is formed which is stirred for another four hours at 25° to 30° C. The reaction mixture is then diluted with 2500 parts of water and the excess hydrocyanic acid is distilled off completely over a column. The solution remaining behind is boiled under reflux for another half an hour. The clear brown solution is then cooled and 50% caustic soda solution is added at 30° C. while stirring until an alkaline reaction has been set up. The solution is then extracted three times, each time with 300 parts of cyclooctylamine, 500 parts of benzene is added to the combined extracts and then washed with 1000 parts of water. Benzene and water are first distilled off azeotropically from the solution. The residue is fractionated first at a pressure of about 10 to 25 mm. Hg, removing the bulk of the amine used as extraction agent. Distillation is then continued at a lower pressure, for example at 0.1 mm. Hg. 454 parts of tetrahydrotricyclopentadienylene diamine mixture having a boiling point of about 125° C. at 0.1 mm. Hg or 216° to 218° C. at 18 mm. Hg is obtained; this is equivalent to a yield of 78.5% based on tricyclopentadiene. The amine number is 475 (calculated value 483).

EXAMPLE 2

A mixture of 1091 parts of 88% sulfuric acid and 812 parts of anhydrous hydrocyanic acid is placed in a vessel having a highspeed stirrer. 495 parts of tricyclopentadiene is added with intense stirring, as in Example 1, the temperature being kept at 0° C. Following an after reaction period of one hour at 0° C., 245 parts of hydrogen cyanide is distilled off at 0° C. in the course of two and a half hours by means of a stream of carrier gas. The temperature is then raised to 30° C. After a further after reaction period of three and a half hours at this temperature, the mixture is worked up as described in Example 1. 523 parts of tetrahydrotricyclopentadienylene diamine mixture is obtained. This is equivalent to a yield of 90.5% with reference to tricyclopentadiene. The amine number is 447 (calculated value 483).

In the following examples the preparation of the polyamides is described:

EXAMPLE 3

A mixture of 53.58 parts of tetrahydrotricyclopentadienylene diamine, 46.42 parts of sebacic acid and 25 parts of water is placed in an autoclave, the latter is flushed with nitrogen three times and the mixture is heated at 230° C. for two hours at autogenous pressure. The pressure in the autoclave is then released; the polycondensation mixture is simultaneously heated to 270° C. and maintained at this temperature for six hours. Wire produced from the polycondensate in conventional manner is tough and completely transparent. The polyamide has a K-value of 55 (1% in concentrated sulfuric acid) and a flow temperature of 230° C.

The fact that the polyamide has great stiffness even at elevated temperature is proved by measuring its softening behavior. For this purpose a specimen sheet having the dimensions 30 mm. x 10 mm. x 2 mm. is prepared and clamped at one of its narrow ends between two jaws to a depth of 5 mm. At the opposite narrow end of the sheet, at a distance of 5 mm. from the edge, a support is fastened to the sheet at right angles thereto which carries a weight of 80 g. at a height of 77 mm. The sheet is immersed in a well-stirred, heatable glycerol bath whose temperature is raised by 5° C. in the course of two minutes. The support for the weight is provided with a pointer which indicates the angle of deflection of the polyamide sheet on a dial. In the case of commercial polyamides this angle of deflection generally begins to increase to 3 to 5° at a temperature very closely above the room temperature of 0° C. The angle of deflection is measured up to 80° C. in dependence on time. In the accompanying diagram the angles of deflection A of various polyamides are plotted against temperature as a measure of the softening behavior. Curve 1 shows the softening behavior of a commercial polycaprolactam (nylon 6) having a K-value of 73, curve 2 that of a corresponding polyamide derived from adipic acid and hexamethylenediamine (nylon 6,6) having a K-value of 72, and curve 3 that of the polyamide prepared according to Example 3 from tetrahydrotricyclopentadienylene diamine and sebacic acid and having a K-value of 55. From a comparison of the curves it may be seen that the polyamide prepared from tetrahydrotricyclopentadienylene diamine and sebacic acid and having a flow temperature of 230° C. has much higher flexural strength than nylon 6 (flow temperature about 220° C.) and is slightly superior with respect to this property even to nylon 6,6 whose flow temperature at 255° C. is considerably higher than that of the polyamide according to this invention.

The polyamide manufactured according to this invention remains completely transparent even when it is boiled in water for several hours or when its melt is allowed to cool slowly (e.g. in the course of 24 hours). Maximum water absorption is about 5% (hence great dimensional stability). In contrast to polycaprolactam, the polymer does not contain any monomers or low molecular weight substances which are extractable with water so that after the wire cooled in a waterbath has been granulated and dried for a short period it can be immediately processed in conventional manner by injection molding or extrusion.

EXAMPLE 4

A mixture of 50.35 parts of tetrahydrotricyclopentadienylen diamine mixture, 41.65 parts of decanedicarboxylic acid and 25 parts of water is polycondensed in an autoclave under the conditions described in Example 3. The polyamide thus obtained is tough and completely transparent. Its transparency is not affected by boiling in water or by slow cooling of a melt of the polymer. The polyamide has a K-value of 53 and a flow temperature of 220° C. Maximum water absorption is about 4%.

EXAMPLE 5

45 parts of caprolactam, 52.5 parts of a salt of adipic acid and hexamethylenediamine, 32.22 parts of tetrahydrotricyclopentadienylene diamine mixture and 20.16 parts of adipic acid are mixed with 37.5 parts of water in an autoclave and polycondensed under the conditions described in Example 3. A tough and completely transparent polycondensate having a K-value of 71 and a flow temperature of 156° C. is obtained. By heating the polyamide in methanol a stable 20% solution is obtained from which very tough films may be cast.

EXAMPLE 6

300 parts of water, 1.74 parts of potassium hydroxide and 3.50 parts of tetrahydrotricyclopentadienylene diamine mixture are mixed in an intensive mixer at room temperature. A solution of 3.59 parts of sebacyl chloride in 200 parts of methylene chloride is added to the stirred diamine solution. The reaction product is separated from the mixture, washed until neutral with water and dried.

4.8 parts of a white powder having a K-value of 40 (1% in concentrated sulfuric acid) is obtained.

We claim:

1. A tetrahydrotricyclopentadienylene diamine having the formula:

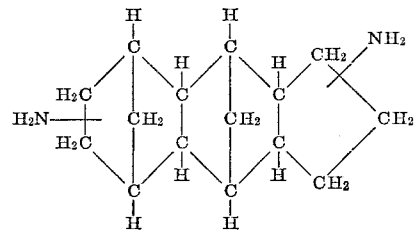

References Cited

UNITED STATES PATENTS 2,632,022   3/1953   Bortnick _____ 260—563

ROBERT V. HINES, Primary Examiner

U.S. Cl. X.R.

260—2, 47, 583, 570.8, 666, 561, 78

PO-1050
(5/69)

UNITED STATES PATENT OFFICE
CERTIFICATE OF CORRECTION

Patent No. 3,505,402                            Dated April 7, 1970

Inventor(s) Paul Raff et al

It is certified that error appears in the above-identified patent and that said Letters Patent are hereby corrected as shown below:

Column 4, line 39, "spherulities" should read --spherulites--; line 54, "8" should read --18--.

Column 5, line 8, "superatomspheric" should read --superatmospheric--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents